INVENTOR
Ermanno Bassani

Michael J. Striker
ATTORNEY

Nov. 14, 1967   E. BASSANI   3,353,065
ELECTRONIC ALARM OR TRIPPING SYSTEM
Filed May 27, 1965   3 Sheets-Sheet 3

INVENTOR.
Ermanno Bassani

Michael J. Striker

_United States Patent Office_

3,353,065
Patented Nov. 14, 1967

3,353,065
ELECTRONIC ALARM OR TRIPPING SYSTEM
Ermanno Bassani, Corso di Porta Vittoria 9,
Milan, Italy
Filed May 27, 1965, Ser. No. 459,324
Claims priority, application Italy, Dec. 19, 1964,
26,982/64
8 Claims. (Cl. 317—27)

ABSTRACT OF THE DISCLOSURE

An electronic arrangement for detecting leakage currents in electrical apparatus. A magnetic core has wound upon it two primary windings and two secondary windings. The two primary windings are connected to the power source as well as to the electrical apparatus driven by this power source. Under normal conditions the currents through the primary windings cause the magnetic flux through the core to be null. When leakage currents prevail the currents through the primary windings are unbalanced and this induces a voltage within one of the secondary windings. The induced voltage operates a transistor which energizes an indicating means or alarm device when the induced voltage exceeds a predetermined magnitude.

---

This invention relates to an alarm or tripping system, and more particularly to an alarm or tripping system for electrical machines and appliances, which utilizes an electrical device for sensing a leakage of electrical current, and then for producing a warning indication or for disconnecting the electrical source of supply.

Faults in the manufacture or assembly of such electrical machines often account for the presence of dangerous electrical currents flowing in the conductive components. For this reason, it has been felt necessary to design a system which during the testing of such machined will perceive small leakage of electrical currents, and which will indicate their presence of a warning indication, or disconnect the electrical source of supply. Previously alarm or tripping systems were large, difficult to set up, particularly on domestic appliances, and furthermore very expensive.

According to the present invention there is provided an alarm or tripping system for electrical apparatus comprising a magnetic core with two equal and opposed windings which can be fed with the current for such electrical apparatus and are capable of producing a flux in the core when there is a current unbalance between the two windings, means for amplifying such signal, and means for feeding the amplified signal to an electronic switch device located in a circuit which includes an operative member normally in the non-conducting state, but which upon receipt of the signal becomes conductive thereby permitting operation of the operative member.

An illustrative embodiment of the invention will now be particularly described with reference to the accompanying drawings wherein.

Figure 1:
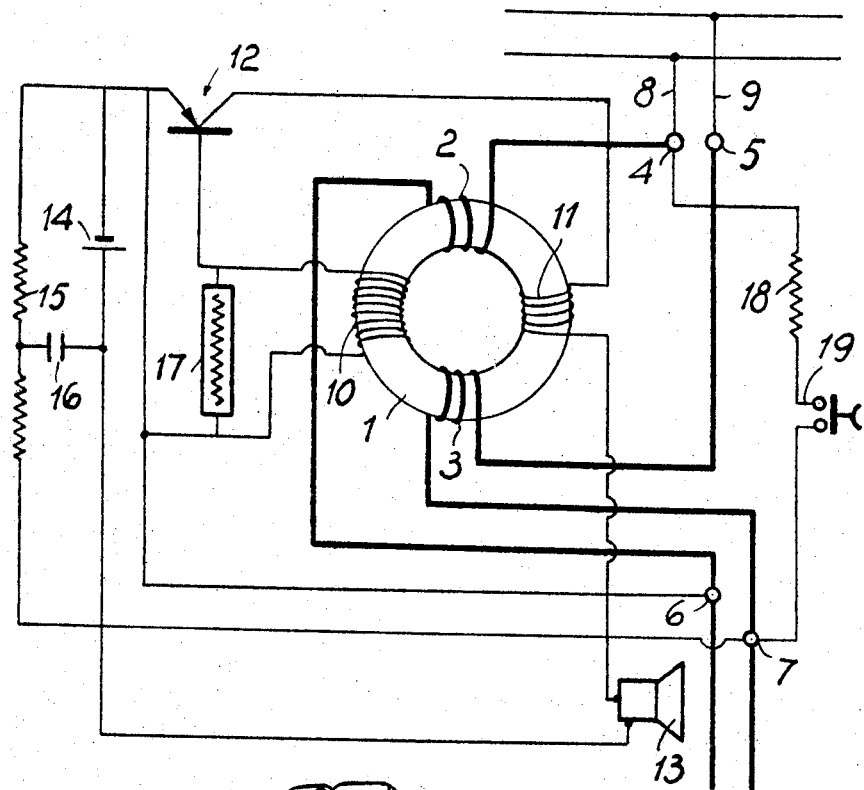
FIG. 1 shows the circuit diagram of this invention, as arranged for an alarm system.
Figure 2:
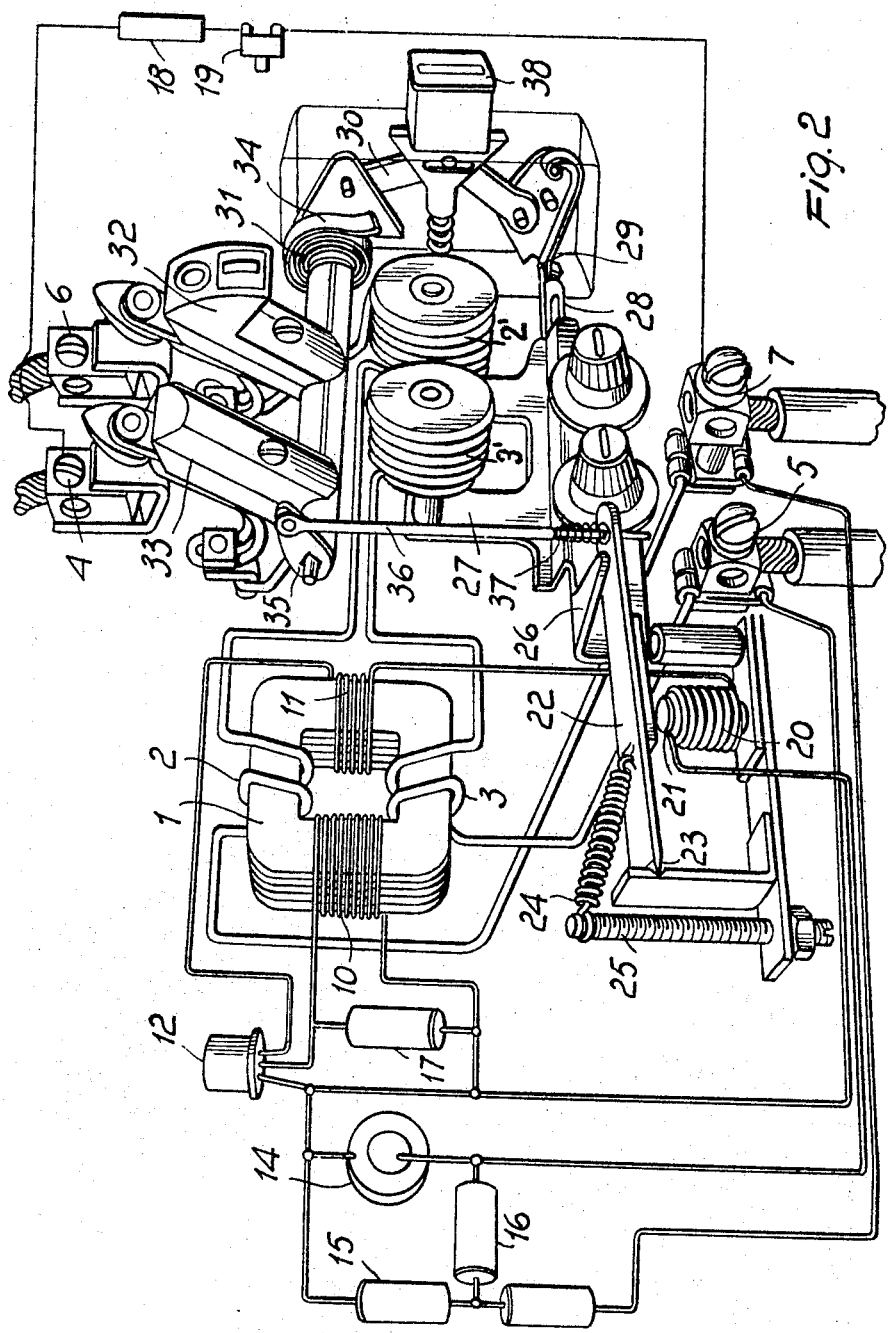
FIG. 2 shows the same circuit as applied to a relay.

In the drawings, FIGURES 1 and 2 show an embodiment of this invention as arranged for single-phase electric machines, although this invention is equally suitable for other applications, for instance in three-phase plants.

The circuit comprises a toroidal magnetic core 1, made of laminated material possessing good ferromagnetic properties, upon which two primary coils 2 and 3 are wound, having at their respective ends terminals 4, 5, 6, 7. Terminals 4 and 5 are connected to the mains supply and terminals 6 and 7 are connected to the input of the electric machine.

The coils 2 and 3 are exactly the same in construction, and are wound so as to generate opposed alternating magnetic fluxes within the laminated core, thus resulting in a null when the coils have the loading current passing through them without a leakage in the electric machinery. When a leakage occurs currents of different value travel through the coils, then the resulting magnetic fluxes will not be in equilibrium, producing null, but will produce a magnetic flux within the core equal to the difference between the two magnetic fluxes associated with the coils.

Two secondary coils 10 and 11 are wound on the magnetic core 1.

In coil 10 an electromotive force is generated by the unbalanced magnetic fluxes associated with the coils 2 and 3, which is proportional to the difference between them. Coil 11 serves together with coil 10 and transistor 12 to complete a threshold regenerative circuit. Coil 10 is connected with the base-emitter junction of transistor 12, while coil 11, is connected to the transistor 12 and the device 13, which in the case of FIGURE 1 is the alarm apparatus, while in FIGURES 2, 3 and 4 it is the relay for interrupting the flow of current.

The circuit is a non-linear threshold amplifier; where, when the voltage in coil 10 is more than a pre-determined value, the value being determined by the characteristics of transistor 12, then the transistor becomes conductive and a current flows through the transistor from emitter to collector, which is proportional to the excess current above the threshold value. A current due to the battery 14 now flows in the coil 11 to produce a positive feed back, which increases the magnetic flux in the core 1 and consequently the electromotive force in the coil 10. This increase in the electromotive force generated in coil 10 further reduces the resistance of the transistor which in turn increases the current flowing in the coil 11. This feed back continues until the magnetic flux being induced by the coil 11 saturates the core 1. At this point further increase of current in coil 11 fails to produce corresponding changes in the magnetic flux, which stops inducing current in the coil 10. The conductivity of the transistor 12 falls, and the current which has been operating the alarm device 13 by flowing from the battery 14, through the transistor, and the coil 11, then ceases. The duration of the cycle of the increase in current through the alarm 13 and its interruption depends on various parameters in the circuit, and can be regulated by them according to the requirements of the alarm 13. Battery 14 also produces a bias potential on a voltage divider 15 which is connected through a condenser 16 so as to make loading more constant.

As the threshold value of the transistor is defined by purely electrical parameters, a high degree of control over its sensitivity is possible. This enables the use of stabilising devices against effects such as ageing, room temperature, and atmospherical agents.

One such stabilising device is 17 a thermistor which guards the circuit against the effects due to variations in the room temperature. Also a manually operable starting device is shown between terminals 4 and 7 which produces an immediate unbalance between the coils and so activates the circuit considerably faster in the case of small leakages of current than would occur from a small unbalance between the coils. This device consists of a resistance 18 and a switch 19, which when closed permits current to flow through one of the coils from the mains supply. Its utilization in this circuit enables the system to operate, with a leakage as low as a milliampere, in a millisecond.

FIGURE 2 shows the same electric circuit as used in FIGURE 1, but incorporated within a relay and switch.

Terminals 4, 5, 6 and 7 become fixed terminals of the switch with the provision that the main coils 2 and 3 are located in series respectively with the coils 2' and 3' of the electromagnetic means of the switch, while the inlet heads of the coils are connected with the mobile contacts of the switch itself.

The instrument 13 is substituted by coil 20 of a magnetised relay. The core 21 of the relay is composed of a permanent magnet, the field of which is opposed to that of the coil 20 when the latter is fed from the battery 14.

When coil 20 has no current flowing through it, core 21 attracts an armature 22, which pivots about a knife edge fulcrum 23, and is subjected to the action of the spring 24, which tends to oppose the attraction of the core 21.

Spring 24 is inclined at a very acute angle to the armature, so that it exerts a very small vertical component, the strength of which is determined by the position of the screw 25. Using the screw 25 to increase the vertical component will tend to draw the armature away from the core.

Armature 22 passes under an arm 26 connected with the movable plates 27 of the relay and switch. This, when biased, rotates shaft 28, such that this disengages a small tooth 29, which then releases a crank device 30, and consequently starts the quick rotation of a shaft 31 due to the tensioning of the spring 34, whereupon the arms 32 and 33 of the switch break contact.

On shaft 31 an arm 35 is supported and from it a small shaft 36 projects downwards with its tapered end passing through a hole in the armature 22. The small shaft supports a spring 37 provided with a shoulder for resting on the armature 22.

When the arms 32 and 33 of the switch are closed, shaft 36 will be raised to the position shown in FIGURE 2, and the spring 37 will not be exerting any pressure on the armature 22.

When the controlling system produces an "alarm" signal the potential of this signal induces a magnetic force in core 21 which is of opposite polarity to the magnetic field of core 21 and thus this existing field is cancelled out. Armature 22 will thus be subjected to the tension force exerted by spring 24, and will be raised rapidly, thus displacing arm 26 and rotating the plates 27. Now, the crank device 30 will release, thus causing the arms 32 and 33 to be violently displaced, thus opening the switch.

When the switch is open, coils 2 and 3 will not be fed, the transistor 12 will return to the non-conductive state, and coil 20 will cease to induce a magnetic force in the magnet 21 which will again exert its attractive force. When arms 32 and 33 are rotated, they cause shaft 31, and arm 35 to rotate, thus lowering the shaft 36, the spring 37 of which will act upon the armature 22 bringing it back into a position of equilibrium, where the same armature is submitted to the attraction by the magnetic core 21. By automatically bringing the armature 22 to its normal position the device can be reset simply and immediately by pushing the button 38. If this button was pressed before the fault in the circuit had been dealt with, then the controlling device would reactivate itself.

In FIGURE 2 the armature 22 is shown together with its supporting frame in displaced position with respect to the main mechanism of the switch only for ease of illustration.

Figure 3:
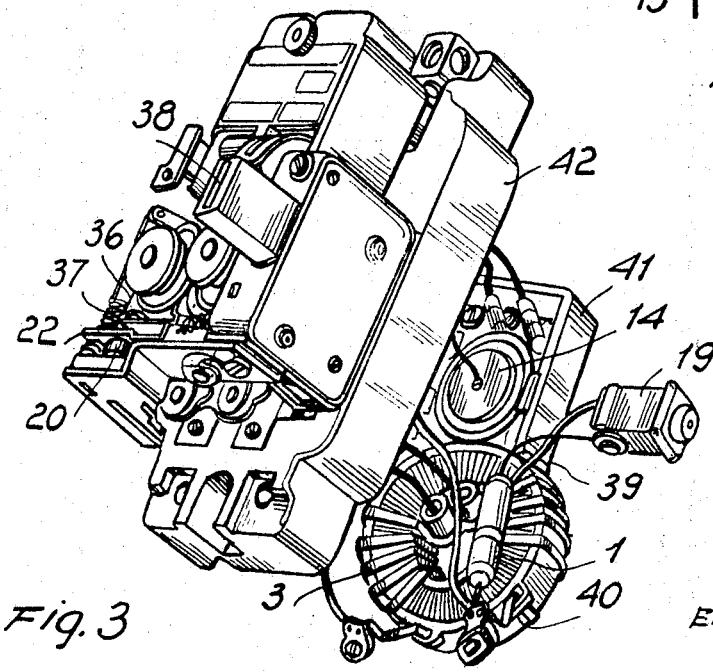
FIGS. 3 and 4 show a method of locating the circuit in combination with the relay.

In FIGURE 3, the electrical and mechanical parts of the apparatus are arranged in the casing 39 which has a recess to provide a front seating 40 circularly shaped for the magnetic core and an elongated seating 41, which contains the voltage divider 15, condenser 16, battery 14, transistor 12 and the other resistances. This casing sits on the lower face of the base plate 42 of the selfacting switch, and the whole is encased within a housing 43, as shown in FIGURE 4.

Figure 4:
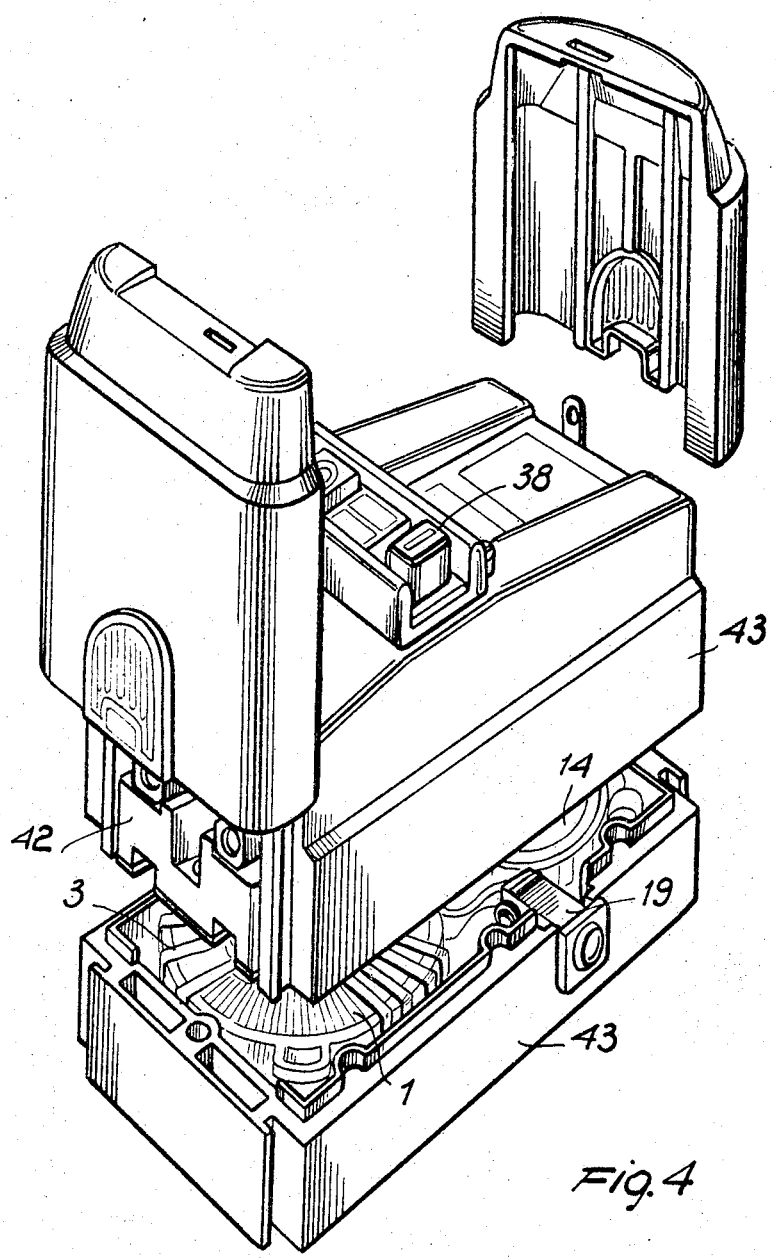

As shown in FIGURES 3 and 4, the electrical device is very small, so that it can easily be coupled with conventional tripping devices, particularly thermally responsive ones.

The casing 39 may also be arranged with signalling devices to facilitate use as a piece of test equipment.

What I claim is:

1. An arrangement for the detection of leakage currents in electrical apparatus comprising, in combination, an electrical power source supplying electrical current to said apparatus through at least two supply lines carrying identical currents during normal operating conditions, and carrying unequal currents under abnormal operating conditions when said leakage currents prevail in said apparatus; a magnetic core; a first primary winding wound upon said magnetic core and connected between said apparatus and one supply line of said electrical power source; a second primary winding wound upon said magnetic core and connected between said apparatus and the other supply line of said electrical power source, said second primary winding being wound upon said core oppositely to that of said first primary winding so that the magnetic flux generated through said core as a result of said primary windings is null during normal operating conditions; a first secondary winding wound upon said core and having an induced current when said magnetic flux in said core is different from null under said abnormal operating conditions; a transistor connected to said first secondary winding and made conductive when said induced current exceeds a predetermined value; a second secondary winding wound upon said core and energized by said transistor when latter is made conductive; and indicating means connected to said second secondary winding and actuated by the current flowing therethrough to indicate the existence of abnormal operating conditions.

2. An arrangement as defined in claim 1, wherein said indicating means is an alarm device emitting an audible sound when actuated by current from said second secondary winding.

3. An arrangement as defined in claim 1, wherein said indicating means is an electromagnetic relay actuated by current from said second secondary winding under abnormal operating conditions.

4. An arrangement as defined in claim 1, including a transistor connected across said first secondary winding for compensating said arrangement against temperature variations.

5. An arrangement as defined in claim 1, including a manually operated switch connected across said two supply lines for causing unbalanced current flow through said primary windings.

6. An arrangement as defined in claim 1, including an auxiliary electrical source connected to said transistor and to said indicating means for supplying latter with current when said transistor becomes conductive.

7. An arrangement as defined in claim 3, wherein said electromagnetic relay comprises a permanent magnet core; a coil wound about said core and energizable by said second secondary winding; an armature attracted to said permanent magnet core during normal operation; and spring means acting upon said armature and tending to draw said armature from said permanent magnet core so that when said coil wound upon said permanent magnet core becomes energized under abnormal operating conditions said spring means moves said armature from said permanent magnet core thereby providing a signal indicating an abnormal operating condition.

8. An arrangement as defined in claim 7, including circuit breaker means operatively connected to said armature, and disconnecting said electrical apparatus from said electrical power source when said armature is displaced by said spring means.

References Cited

UNITED STATES PATENTS 3,187,225  6/1965  Mayer _____ 317—27 X

MILTON O. HIRSHFIELD, *Primary Examiner.*

J. D. TRAMMELL, *Assistant Examiner.*